(12) United States Patent
Phan et al.

(10) Patent No.: US 8,755,953 B2
(45) Date of Patent: Jun. 17, 2014

(54) AIRCRAFT INFORMATION MANAGEMENT SYSTEM

(75) Inventors: Tri Minh Phan, Renton, WA (US); Douglas Lee Wiese, Bothell, WA (US); David Alexander Bush, Renton, WA (US)

(73) Assignee: The Boeing Company, Chicago, IL (US)

( * ) Notice: Subject to any disclaimer, the term of this patent is extended or adjusted under 35 U.S.C. 154(b) by 93 days.

(21) Appl. No.: 13/476,829

(22) Filed: May 21, 2012

(65) Prior Publication Data

US 2013/0311007 A1  Nov. 21, 2013

(51) Int. Cl.
*G01C 23/00* (2006.01)

(52) U.S. Cl.
USPC .................................................... 701/3

(58) Field of Classification Search
USPC .................................................... 701/3
See application file for complete search history.

(56) References Cited

U.S. PATENT DOCUMENTS

| | | | |
|---|---|---|---|
| 7,069,261 B2 * | 6/2006 | Ahl et al. ............................. | 1/1 |
| 7,702,435 B2 * | 4/2010 | Pereira et al. ................ | 701/30.8 |
| 7,925,978 B1 * | 4/2011 | McGavran et al. ........... | 715/723 |
| 8,022,843 B2 | 9/2011 | Mitchell et al. | |
| 8,023,936 B2 * | 9/2011 | Hudson et al. ................ | 455/421 |
| 2005/0153648 A1 * | 7/2005 | Horner et al. .................. | 454/74 |
| 2005/0232185 A1 * | 10/2005 | Hudson et al. ................ | 370/328 |
| 2006/0108873 A1 * | 5/2006 | Hamasaki et al. ........... | 307/10.1 |
| 2006/0215568 A1 | 9/2006 | Smith | |
| 2008/0117858 A1 * | 5/2008 | Kauffman ..................... | 370/316 |
| 2008/0142642 A1 * | 6/2008 | Marino et al. ................ | 244/223 |
| 2008/0184166 A1 * | 7/2008 | Getson et al. ................. | 715/810 |
| 2008/0272915 A1 * | 11/2008 | Day .......................... | 340/572.1 |
| 2009/0192659 A1 * | 7/2009 | Beebe et al. ...................... | 701/2 |
| 2010/0039310 A1 * | 2/2010 | Smith et al. ..................... | 342/29 |
| 2010/0280725 A1 * | 11/2010 | Cahill .............................. | 701/70 |
| 2011/0057830 A1 * | 3/2011 | Sampigethaya et al. ........ | 342/36 |
| 2011/0176617 A1 | 7/2011 | Fagan et al. | |
| 2011/0185207 A1 | 7/2011 | Anandappan et al. | |
| 2011/0199976 A1 * | 8/2011 | Mitchell et al. ............... | 370/328 |
| 2011/0231036 A1 * | 9/2011 | Yogesha et al. ................... | 701/3 |
| 2012/0038492 A1 * | 2/2012 | Maggiore et al. ............. | 340/945 |
| 2012/0041639 A1 * | 2/2012 | Followell et al. ............ | 701/34.3 |
| 2012/0075119 A1 * | 3/2012 | Dorneich et al. ............. | 340/945 |
| 2012/0075123 A1 * | 3/2012 | Keinrath et al. ............... | 340/963 |
| 2012/0324420 A1 * | 12/2012 | Collinson ..................... | 717/105 |
| 2013/0031543 A1 * | 1/2013 | Angus ............................... | 718/1 |

FOREIGN PATENT DOCUMENTS

WO   2009148639 A2   12/2009

OTHER PUBLICATIONS

PCT search report dated Sep. 12, 2013, application PCT/US2013/041903, filing dat May 20, 2013, applicant The Boeing Company, 8 pages.

* cited by examiner

*Primary Examiner* — Hussein A. Elchanti
(74) *Attorney, Agent, or Firm* — Yee & Associates, P.C.

(57) ABSTRACT

A method and apparatus comprising an existing aircraft node and an information agent located in the existing aircraft node. The existing aircraft node is connected to a number of aircraft systems and a network in an aircraft network data processing system. The information agent is configured to provide access to information received by the existing aircraft node to other aircraft nodes in the aircraft network data processing system.

20 Claims, 6 Drawing Sheets

AIRCRAFT INFORMATION MANAGEMENT SYSTEM

BACKGROUND INFORMATION

1. Field

The present disclosure relates generally to aircraft and, in particular, to managing information in aircraft. Still more particularly, the present disclosure relates to a method and apparatus for obtaining information from line replaceable units in an aircraft.

2. Background

Aircraft increasingly have more and more electrical systems that control the operation of the aircraft, monitor the operation of the aircraft, and provide other functions. These electrical systems may be nodes in an aircraft network data processing system. Oftentimes, these nodes are implemented as line replaceable units. A line replaceable unit receives information needed to perform operations through connections to various devices.

For example, a line replaceable unit in an environmental control system may have connections to temperature sensors, airflow sensors, carbon dioxide sensors, vent actuators, cooling units, heating units, and other devices. The line replaceable unit may receive information from the different sensors and control operation of the heating units, cooling units, and vents to provide a desired environment within the aircraft. These different components are typically connected directly to the line replaceable unit. These connections may be made using wires and data buses that are directly connected to a line replaceable unit.

Currently, if another line replaceable unit needs temperature information from the same locations as the sensors for the first line replaceable unit, additional sensors may be placed at those locations and connected to the second line replaceable unit, or additional connections may be made between the second line replaceable unit and the existing temperature sensors. The addition of new sensors or new connections from additional sensors may require the routing of wiring through the aircraft. In existing aircraft, the ability to route new wiring may be limited and more costly than desired.

Adding additional sensors may increase the cost and weight of the aircraft more than desired. Connecting the second line replaceable unit to the temperature sensors using wires or optical fibers may also increase the time and expense needed. Further, generating additional communications links to the different sensors or components may take more time than desired and increase the complexity of the aircraft more than desired. Moreover, this increase in wires or optical fibers within the aircraft also may result in more maintenance than desired.

Therefore, it would be desirable to have a method and apparatus that takes into account at least some of the issues discussed above, as well as other possible issues.

SUMMARY

In one illustrative embodiment, an apparatus comprises an existing aircraft node and an information agent located in the existing aircraft node. The existing aircraft node is connected to a number of aircraft systems and a network in an aircraft network data processing system. The information agent is configured to provide access to information received by the existing aircraft node to other aircraft nodes in the aircraft network data processing system.

In another illustrative embodiment, an apparatus comprises an aircraft node and an information agent located in the aircraft node. The aircraft node is configured to be located in an aircraft and communicate with a number of aircraft systems in the aircraft. The information agent is configured to identify information received from the number of aircraft systems that correspond to a subscription for an application in a host aircraft node in the aircraft and send the information identified to the application in the host aircraft node.

In yet another illustrative embodiment, an information management system comprises an aircraft node, a host aircraft node, an information agent in the aircraft node, and a manager located in the host aircraft node. The aircraft node is configured to be located in an aircraft and communicate with a number of aircraft systems in the aircraft. The host aircraft node is configured to communicate with the aircraft node. The information agent is configured to identify information received from the number of aircraft systems that correspond to a request from the host aircraft node in the aircraft and send the information identified to the host aircraft node. The manager is configured to process the information received from the information agent from the aircraft node and process the information received from the aircraft node.

In yet another illustrative embodiment, a method for collecting information in an aircraft is present. Information received from a number of aircraft systems at an aircraft node is identified using a number of connections to the number of aircraft systems. The information identified is requested information that is requested by an application in a host aircraft node. The requested information is sent to the application in the host aircraft node.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that one solution may be to connect nodes, such as line replaceable units, and the other devices in the different aircraft systems to a network. For example, a set of sensors may be connected to the network. If a line replaceable unit that is not directly connected to a set of sensors needs information from those sensors, that information may be obtained from the set of sensors through the network.

The illustrative embodiments take into account that this solution may be useful in designing and building new aircraft. However, with existing aircraft, changing existing connections between line replaceable units and other devices in the aircraft may be more time consuming, more complex, and more difficult than desired. These connections are physical connections using physical links such as wires and optical fibers.

For example, access to install new wiring and space for new wiring may be limited or unavailable in the aircraft. As a result, the currently used point-to-point connections between line replaceable units and existing aircraft systems may be more limited than desired.

As a result, obtaining information from an existing aircraft system requires making a new connection between the existing aircraft system and the line replaceable unit in which the information is desired. Establishing a connection is often more difficult than desired. When limited access is present, numerous components may need to be removed to provide the access needed to make the new connection.

In some cases, access to make the new connection may be infeasible. Consequently, information desired for use in a line replaceable unit not already connected to the existing aircraft system may be unavailable when a new connection cannot be made.

Thus, the illustrative embodiments recognize and take into account that when a line replaceable unit or an application in a line replaceable unit needs information from an existing aircraft system, making a new connection to a line replaceable unit or connecting the existing aircraft system to a network may be more difficult than desired.

Instead, the illustrative embodiments recognize and take into account that the different line replaceable units may be connected to each other or another node directly or through a network to which the line replaceable units are connected. These connections may be easier to make compared to making a new connection to an existing aircraft system from which information is desired. The line replaceable unit with the existing connection to the aircraft system may be configured to send information that is desired from the existing aircraft system to the line replaceable unit in which the information is desired.

The illustrative embodiments recognize and take into account that information collected by the line replaceable unit using existing connections may be sent to another node for processing using a function included in the line replaceable unit. For example, if a second line replaceable unit needs information from the sensors connected to a first line replaceable unit, that information may be gathered by the first line replaceable unit and sent to the second line replaceable unit. This information is already gathered by the first line replaceable unit as part of its existing functionality. Therefore, existing connections do not need to be changed. As a result, the time and complexity of upgrading or changing nodes in an aircraft may be reduced.

Figure 1:
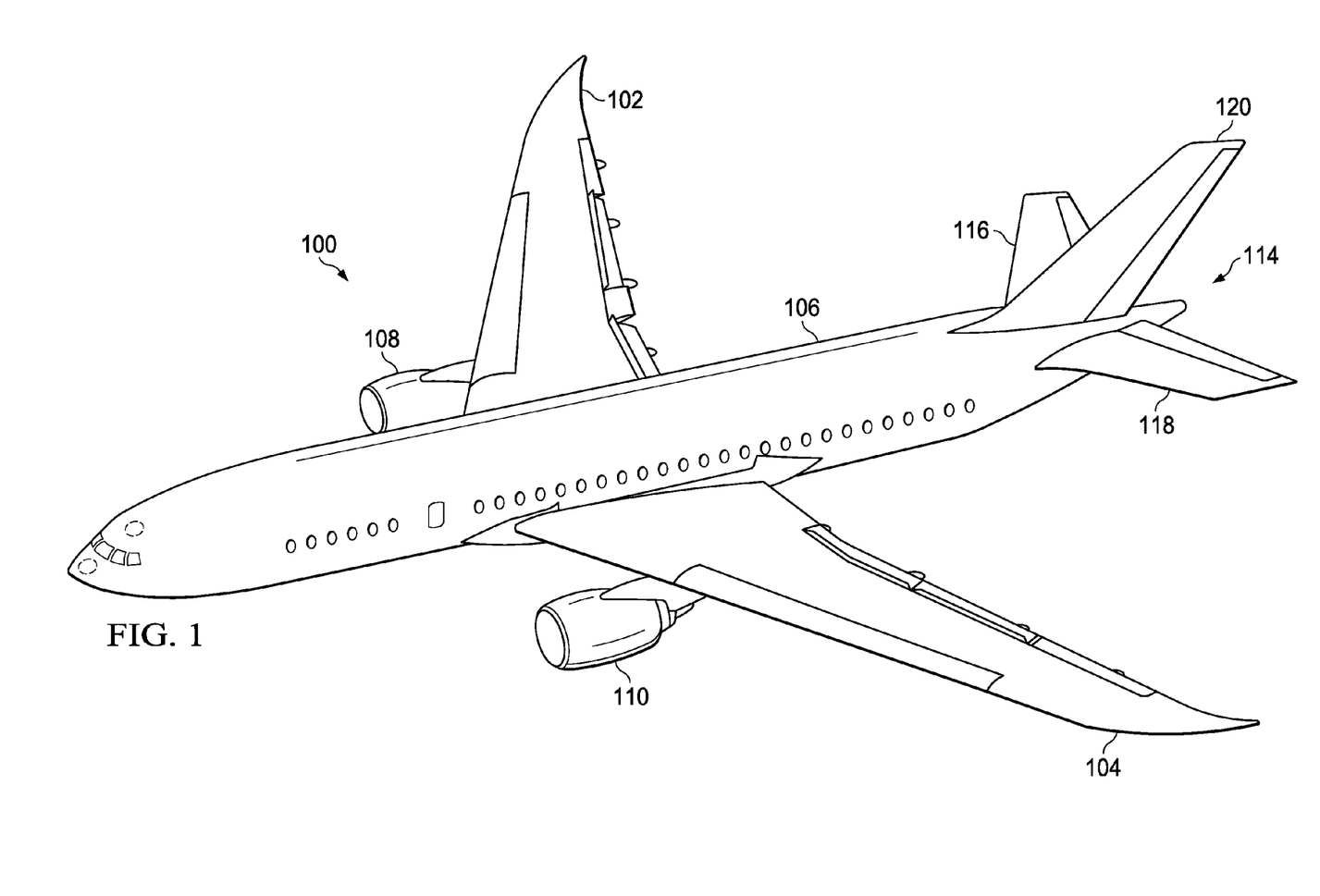
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 114. Horizontal stabilizer 116, horizontal stabilizer 118, and vertical stabilizer 120 are attached to tail section 114 of body 106.

Aircraft 100 is an example of an aircraft in which an aircraft network data processing system may be implemented with an information management system in accordance with an illustrative embodiment. The information management system may be used to obtain information from aircraft systems that are not directly connected to the aircraft network data processing system.

Figure 2:
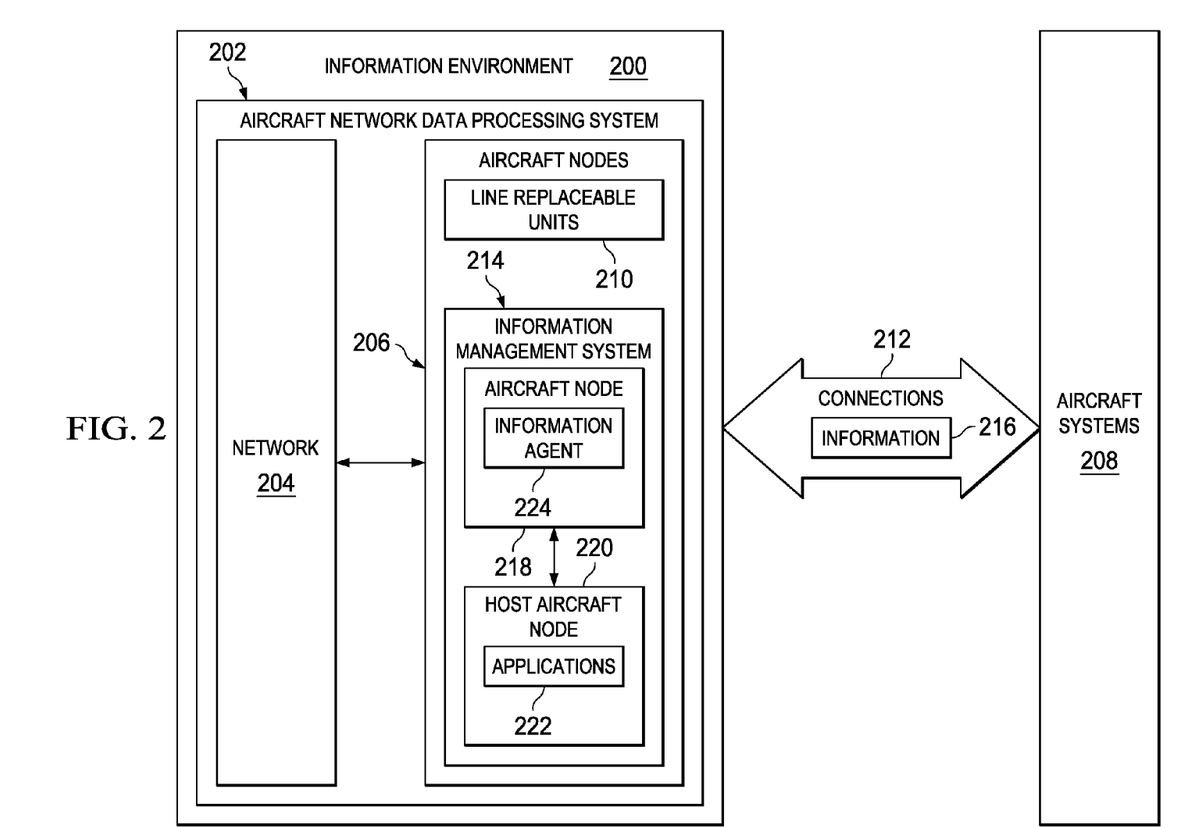
FIG. 2 is an illustration of a block diagram of an information environment in accordance with an illustrative embodiment.

With reference now to FIG. 2, an illustration of a block diagram of an information environment is depicted in accordance with an illustrative embodiment. As depicted, information environment 200 is an example of an information environment that may be implemented within aircraft 100 in FIG. 1.

As depicted, information environment 200 includes aircraft network data processing system 202. Aircraft network data processing system 202 includes network 204 and aircraft nodes 206.

Network 204 is a medium used to provide communications between aircraft nodes 206 in aircraft network data processing system 202. Network 204 may include connections such as wired communications links, wireless communications links, optical communications links, and other suitable types of connections.

Aircraft nodes 206 are hardware devices. Aircraft nodes 206 are configured to process information. Additionally, aircraft nodes 206 also may control operation of aircraft systems 208. These nodes may be, for example, without limitation, computers, processor units, controllers, or other suitable devices.

Aircraft systems 208 may take various forms. For example, without limitation, aircraft systems 208 may be at least one of a sensor system, a flight recorder, a navigation system, a flight control system, an environmental control system, an engine system, or some other suitable type of system.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In these illustrative examples, aircraft nodes 206 take the form of line replaceable units 210. A line replaceable unit in line replaceable units 210 is a modular component that is designed to be quickly replaced at the location of the line replaceable unit. A line replaceable unit is typically sealed in a housing. In these illustrative examples, line replaceable units 210 may include computers, processor units, controllers, and other suitable types of devices.

As depicted, one or more of aircraft nodes 206 may be connected to aircraft systems 208 through connections 212. Connections 212 are connections outside of network 204 in these illustrative examples. In other words, aircraft systems 208 are not "networked" as part of aircraft network data processing system 202. In some illustrative examples, connections 212 may be referred to as direct connections because aircraft systems 208 may be directly connected to one or more of aircraft nodes 206 using wires, optical fibers, or some combination thereof.

Connections 212 may be, for example, wires in data buses that carry analog signals. These wires are physically routed to one or more of aircraft nodes 206.

In these illustrative examples, information management system 214 may be used to obtain information 216 from a number of aircraft systems 208. As used herein, a "number of" when used with reference to items means one or more items. For example, a number of aircraft systems 208 is one or more aircraft systems.

In this illustrative example, information management system 214 comprises aircraft node 218 in aircraft nodes 206 and host aircraft node 220. Aircraft node 218 is connected to a number of aircraft systems 208 and network 204. Host aircraft node 220 may be a node in aircraft nodes 206 in these illustrative examples. Host aircraft node 220 is connected to network 204.

As depicted, applications 222 run on host aircraft node 220. These applications take the form of software, hardware, or a combination of the two. An application may perform various functions that require information 216 from a number of aircraft systems 208. Host aircraft node 220, however, does not have a connection to the number of aircraft systems 208 from which information 216 is obtained through network 204.

In these illustrative examples, information agent 224 is located in aircraft node 218. Information agent 224 is a function, process or some combination thereof that may be implemented in software, hardware or a combination of the two. Information agent 224 communicates using network 204.

Information agent 224 is configured to provide access to information 216 received by aircraft node 218 to other aircraft nodes in aircraft nodes 206 in aircraft network data processing system 202. In these illustrative examples, information agent 224 provides a pass-through function for information 216. In other words, information 216 may be sent to host aircraft node 220 for use by one or more of applications 222 in addition to being processed or otherwise used by aircraft node 218.

Information agent 224 responds to requests originated by applications 222 for information 216 that is needed by a number of applications 222 running on host aircraft node 220. Information agent 224 may collect information 216 and send information 216 to applications 222 on host aircraft node 220.

As a result, information 216 may be used both by aircraft node 218 and by a number of applications 222. This use of information 216 occurs without needing additional connections in connections 212 from host aircraft node 220 to number of aircraft systems 208. Further, information 216 may be obtained without connecting aircraft systems 208 to network 204 in these illustrative examples. Further, information 216 obtained may be changed over time through applications 222 sending new requests to information agent 224. The change in information 216 may be performed without modification to connections to number of aircraft systems 208. In other words, additional connections to number of aircraft systems 208 are not needed.

In this manner, information agents may be used within aircraft nodes 206 to provide other aircraft nodes in aircraft nodes 206 with access to information from aircraft systems 208 connected to those other aircraft nodes. In these illustrative examples, the aircraft nodes in aircraft nodes 206 that have connections 212 to aircraft systems 208 may be existing aircraft nodes. As a result, the aircraft nodes in aircraft nodes 206 with information agents may act as access points for obtaining information 216 from aircraft systems 208.

Figure 3:
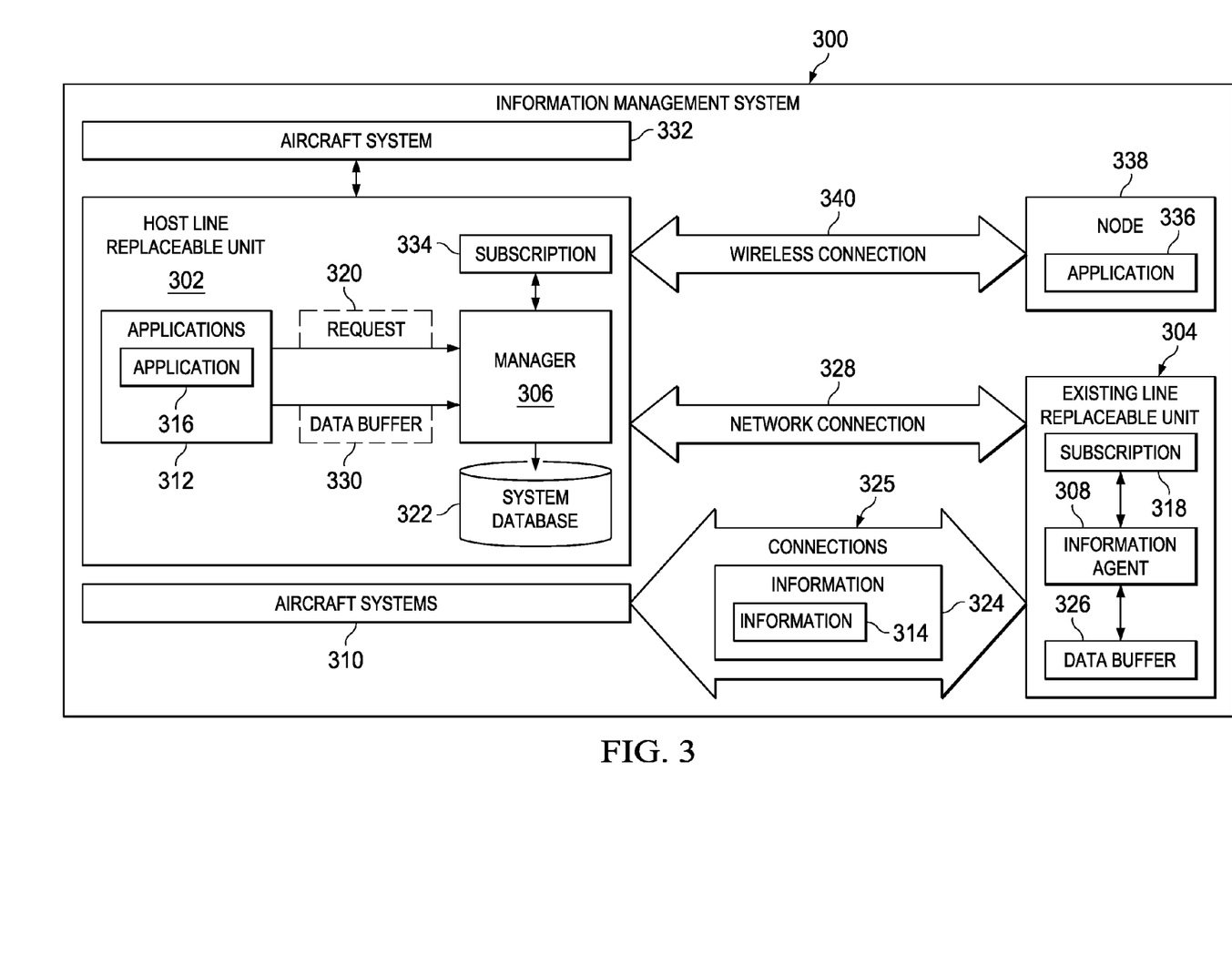
FIG. 3 is an illustration of a block diagram of an information management system in accordance with an illustrative embodiment.

Turning now to FIG. 3, an illustration of a block diagram of an information management system is depicted in accordance with an illustrative embodiment. Information management system 300 in FIG. 3 is an example of one implementation for information management system 214 in FIG. 2.

As depicted, information management system 300 includes host line replaceable unit 302 and existing line replaceable unit 304. Host line replaceable unit 302 is an example of host aircraft node 220 in FIG. 2. Existing line replaceable unit 304 is an example of aircraft node 218 in FIG. 2. As depicted, manager 306 is located in host line replaceable unit 302 and information agent 308 is located in existing line replaceable unit 304.

In these illustrative examples, applications 312 run on host line replaceable unit 302. Applications 312 may take a number of different forms. For example, applications 312 may be at least one of an engine vibration monitoring application, a maintenance application, a fuel use application, a health monitoring application, and other suitable types of applications.

A number of applications 312 may require information 314 from a number of aircraft systems 310. As depicted, aircraft systems 310 are connected to existing line replaceable unit 304 and are in communication with existing line replaceable unit 304.

Aircraft systems 310, however, are not in communication with host line replaceable unit 302 in this illustrative example. As a result, host line replaceable unit 302 is unable to obtain information 314 from the number of aircraft systems 310. In other words, a connection that allows for an exchange of data between number of aircraft systems 310 and host line replaceable unit 302 is absent in this illustrative example.

In these illustrative examples, manager 306 and information agent 308 communicate with each other to provide information 314 from the number of aircraft systems 310 needed by applications 312. For example, information agent 308 is configured to respond to requests originated from application 316 to identify information 314 received from the number of aircraft systems 310 for application 316 in applications 312 in host line replaceable unit 302. Information 314 is identified by information agent 308 using subscription 318 application 316. Subscription 318 originates from requests generated by application 316.

When information 314 is received from the number of aircraft systems 310 and identified by information agent 308, information 314 is sent to application 316 in host line replaceable unit 302. In these illustrative examples, information agent 308 is configured to encrypt information 314 before sending information 314 to application 316. In this manner, information 314 may be maintained as confidential and secure.

In another illustrative example, application 316 sends request 320 for information 314 to manager 306. Manager 306 uses system database 322 to identify a source for information 314. In these illustrative examples, the source may be one or more nodes in the aircraft network data processing system. In some illustrative examples, the node that is the source for information 314, may be, for example, host line replaceable unit 302 itself. System database 322 is a database identifying different nodes and aircraft systems connected to those nodes.

Using system database 322, manager 306 identifies existing line replaceable unit 304 as a node having connections to the number of aircraft systems 310 that are configured to supply information 314 that is needed by application 316. In response to identifying existing line replaceable unit 304, manager 306 communicates with information agent 308 in existing line replaceable unit 304 to generate subscription 318.

Information agent 308 monitors information 324 received from number of aircraft systems 310 over connections 325 for information 314 for application 316 using subscription 318 for application 316 in host line replaceable unit 302. Connections 325 are direct connections between existing line replaceable unit 304 and aircraft systems 310 in these illustrative examples. As depicted, information 324 is information used by existing line replaceable unit 304 to perform various functions within an aircraft.

When information 314 is identified in information 324, information 314 is placed into data buffer 326 in existing line replaceable unit 304. Information 314 is then transmitted from data buffer 326 to manager 306 in host line replaceable unit 302 over network connection 328. In these illustrative examples, network connection 328 may be comprised of one or more communications links within network 204 in FIG. 2. Information 314 is then sent to application 316.

In this illustrative example, information 314 may be sent to application 316 by manager 306 through data buffer 330. For example, information 314 may be placed in data buffer 330, and application 316 may retrieve information 314 from data buffer 330. Data buffer 330 is a data buffer associated with application 316. Although the illustrative examples use a data buffer, other types of storage or other types of mechanisms may be used in addition to or in place of data buffer 330 to send information 314 to application 316.

In these illustrative examples, each application in applications 312 requesting information may have a separate data buffer. Alternatively, data buffer 330 may be common to all of applications 312 with each application looking for information in specific address ranges.

In some illustrative examples, a portion or all of information 314 requested by application 316 may be obtained locally through host line replaceable unit 302. For example, host line replaceable unit 302 may be connected to aircraft system 332. In this case, if information 314 identified by request 320 is available from aircraft system 332, manager 306 may generate subscription 334 to identify when information 314 is received from aircraft system 332. In this case, information 314 may be placed in data buffer 330 by manager 306 when received from aircraft system 332.

Additionally, information 314 also may be transmitted to application 336 located on node 338. In this illustrative example, node 338 may be a computer, a tablet computer, a laptop, or some other device located outside of an aircraft network data processing system. In other words, node 338 is not normally connected to the aircraft network data processing system. Node 338 may communicate with host line replaceable unit 302 over wireless connection 340.

In this illustrative example, information 314 may be placed into a data buffer assigned to application 336. Manager 306 may transmit information 314 found in the buffer to application 336 in node 338 over wireless connection 340.

Further, application 316 may make additional requests for information as the need for information changes. Additionally, other applications in applications 312 also may generate requests for information.

Figure 4:
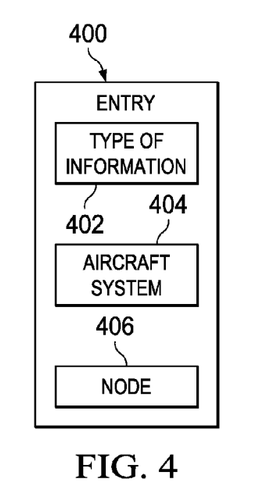
FIG. 4 is an illustration of a block diagram of an entry in a system database in accordance with an illustrative embodiment.

Turning now to FIG. 4, an illustration of a block diagram of an entry in a system database is depicted in accordance with an illustrative embodiment. In this illustrative example, entry 400 is an example of an entry in system database 322 in FIG. 3. In this illustrative example, entry 400 includes fields for type of information 402, aircraft system 404, and node 406.

The field for type of information 402 identifies what type of information is to be obtained for an application. Type of information 402 may be, for example, without limitation, fuel use, temperature, pressure, engine temperature, cabin temperature, outside temperature, control surface position, and other suitable types of information.

Type of information 402 also may include meta data that describes other types of information. The meta data may be, for example, resolution, calculation rate, transmission rate, and other suitable types of information. This meta data may be used by application 312 and manager 306 to determine which source of data should be used if more than one is available. Of course, type of information 402 may identify more than one aircraft system in these illustrative examples.

The field for aircraft system 404 identifies the aircraft system that provides the desired type of information. For example, without limitation, aircraft system 404 may be selected from one of a sensor system, a flight recorder, a navigation system, a flight control system, an environmental control system, an engine system, or some other suitable type of system. Of course, aircraft system 404 may identify more than one aircraft system in these illustrative examples.

The field for node 406 identifies a node connected to the aircraft system identified by aircraft system 404. This identification in node 406 may be, for example, without limitation, an Internet Protocol (IP) address, an alphanumeric designation, or some other suitable type of identifier. In some illustrative examples, node 406 may be actually part of aircraft system 404 and connected to various components that provide type of information 402.

Thus, when type of information 402 is requested from an application, node 406 in entry 400 identifies a node in an aircraft network data processing system from which information may be obtained. In these illustrative examples, node 406 is a field that identifies a node in which an agent, such as information agent 224 in FIG. 2, is present.

Additionally, the request also may identify the aircraft system from which type of information 402 is available. Thus, if type of information 402 is available from more than one aircraft system, aircraft system 404 in entry 400 may be used to identify which aircraft system should be used to obtain the information.

Of course, entry 400 may include other fields in addition to or in place of the ones depicted in this figure. In other examples, aircraft system 404 may be omitted.

Figure 5:
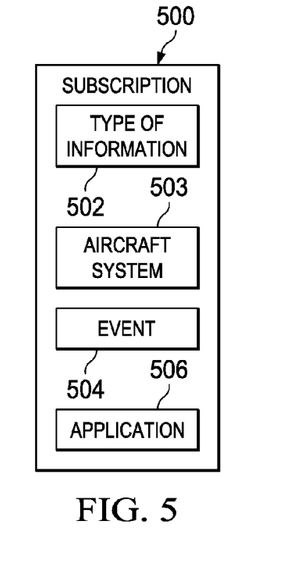
FIG. 5 is an illustration of a block diagram of a subscription in accordance with an illustrative embodiment.

Turning now to FIG. 5, an illustration of a block diagram of a subscription is depicted in accordance with an illustrative embodiment. Subscription 500 is an example of one manner in which subscription 318 and subscription 334 in FIG. 3 may be implemented. As depicted, subscription 500 includes type of information 502, aircraft system 503, event 504, and application 506.

Type of information 502 identifies one or more types of information that should be sent for subscription 500. Event 504 identifies when type of information 502 should be sent. For example, event 504 may be a periodic event or a nonperiodic event. In these illustrative examples, event 504 may indicate that type of information 502 is to be collected and sent only once.

In other illustrative examples, event 504 may indicate that type of information 502 should be sent each time event 504 occurs. Event 504 may be, for example, when a value for type of information 502 exceeds a threshold or has a particular value. For example, event 504 may indicate that type of information 502 should be sent every five seconds, every hour, or after some other periodic event.

In other illustrative examples, event 504 may indicate that type of information 502 should be streamed constantly as type of information 502 is received. In this case, information 314 is placed in data buffer 326 for transmission to manager 306 as information 314 is received from aircraft systems 310.

The illustration of subscription 500 in FIG. 5 is not meant to limit the manner in which a subscription may be implemented. Other types of information may be included in addition to or in place of the types of information illustrated in subscription 500. For example, subscription 500 may include an identification of one or more aircraft systems from which information should be collected and sent to an application. The identification of the aircraft system may be used in addition to or in place of subscription 500.

The illustrations of information environment 200 in FIG. 2, information management system 300 in FIG. 3, and other components in FIGS. 2-5 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more host nodes in addition to host aircraft node 220 may be present in aircraft nodes 206. In still other illustrative examples, information management system 214 may be considered to include information agent 224 and host aircraft node 220. In still other illustrative examples, information management system 300 may be considered to include manager 306 and information agent 308 and not include host line replaceable unit 302 and existing line replaceable unit 304.

In still other illustrative examples, application 316 may include an identification of type of information 402 and node 406 in request 320 to manager 306. With this example, system database 322 may be unnecessary.

As another illustrative example, network 204 may be a single connection between aircraft node 218 and host aircraft node 220. As another example, network connection 328 between existing line replaceable unit 304 and host line replaceable unit 302 may be a communications link such as a wire, an optical fiber, or a wireless medium.

In some illustrative examples, connections 212 may be existing connections between aircraft systems 208 and aircraft node 218. Aircraft node 218 in aircraft nodes 206 may be an existing aircraft node to which aircraft systems 208 are connected. In other words, the existing aircraft nodes and the existing connections may already be present before information agent 224 is implemented in the existing aircraft nodes. In other illustrative examples, information agent 224 may be implemented at substantially the same time as aircraft network data processing system 202 and aircraft systems 208 for a new aircraft. In other words, information management system 214 may be implemented such that large changes to the design of an aircraft, such as connecting aircraft systems 208 to network 204, may be avoided.

Figure 6:
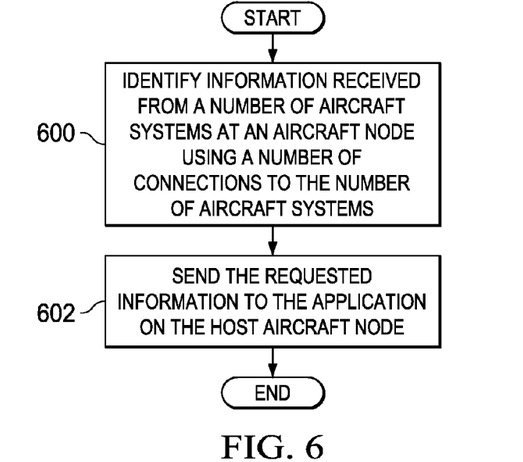
FIG. 6 is an illustration of a flowchart of a process for collecting information in accordance with an illustrative embodiment.

With reference now to FIG. 6, an illustration of a flowchart of a process for collecting information is depicted in accordance with an illustrative embodiment. In this depicted example, the different operations may be implemented in information management system 214 in FIG. 2 and information management system 300 in FIG. 3.

The process begins by identifying information received from a number of aircraft systems at an aircraft node using a number of connections to the number of aircraft systems (operation 600). In operation 600, the information identified is requested information that is requested by an application in a host aircraft node.

The process then sends the requested information to the application on the host aircraft node (operation 602) with the process terminating thereafter. The requested information is sent to the application in the host aircraft node using a network in an aircraft network data processing system. In these illustrative examples, operation 600 and operation 602 may be implemented in an information agent in the information management system. In this manner, the information agent may cause the aircraft node to function as an access point for other aircraft nodes.

Figure 7:
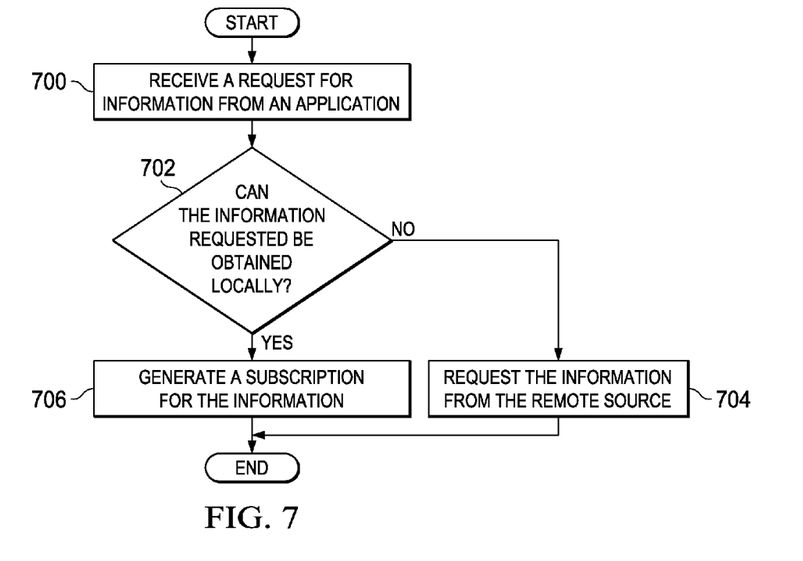
FIG. 7 is an illustration of a flowchart of a process for processing requests from applications in accordance with an illustrative embodiment.

With reference now to FIG. 7, an illustration of a flowchart of a process for processing requests from applications is depicted in accordance with an illustrative embodiment. The process illustrated in FIG. 7 may be implemented in a host node, such as host aircraft node 220 in FIG. 2 or host line replaceable unit 302 in FIG. 3. In these illustrative examples, one or more of the operations may be implemented in manager 306 in FIG. 3.

The process begins by receiving a request for information from an application (operation 700). The process then determines whether the information requested can be obtained locally (operation 702). This determination may be made using system database 322 in FIG. 3. If the information cannot be obtained locally, the process requests the information from the remote source (operation 704) with the process terminating thereafter.

With reference again to operation 702, if the information can be obtained locally, the process generates a subscription for the information (operation 706) with the process terminating thereafter. This subscription may be used by the process to identify desired information requested by the application as information is received from one or more aircraft systems connected to the node on which this process runs.

Figure 8:
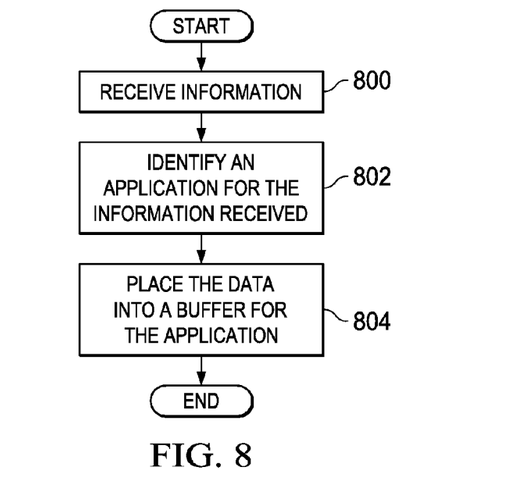
FIG. 8 is an illustration of a flowchart of a process for receiving information in accordance with an illustrative embodiment.

Turning now to FIG. 8, an illustration of a flowchart of a process for receiving information is depicted in accordance with an illustrative embodiment. The process illustrated in FIG. 8 may be implemented in a manager, such as manager 306 in FIG. 3.

The process begins by receiving information (operation 800). This information may be received either over a network connection from an information agent or locally from aircraft systems. The process identifies an application for the information received (operation 802). In this illustrative example, the identification of the application may be included in the information received. The information agent sending the information may include an identifier for the application that is to receive the information. The process then places the data into a buffer for the application (operation 804) with the process terminating thereafter.

Figure 9:
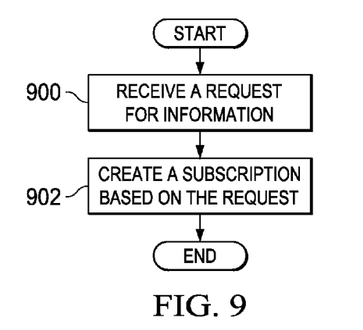
FIG. 9 is an illustration of a flowchart of a process for establishing a subscription in accordance with an illustrative embodiment.

Turning now to FIG. 9, an illustration of a flowchart of a process for establishing a subscription is depicted in accordance with an illustrative embodiment. The process illustrated in FIG. 9 may be implemented in an aircraft node, such as aircraft node 218 in FIG. 2, or existing line replaceable unit 304 in FIG. 3. In particular, this process may be implemented using information agent 308 to establish a subscription. In some cases, one or more of the operations in FIG. 9 may be implemented in manager 306 to establish subscriptions for information that may be obtained locally. In this illustrative example, information may be obtained locally when the information is obtained from an aircraft system connected to the aircraft node on which the manager is located.

The process begins by receiving a request for information (operation 900). This request may include an identification of the type of information. The process then creates a subscription based on the request (operation 902) with the process terminating thereafter.

Figure 10:
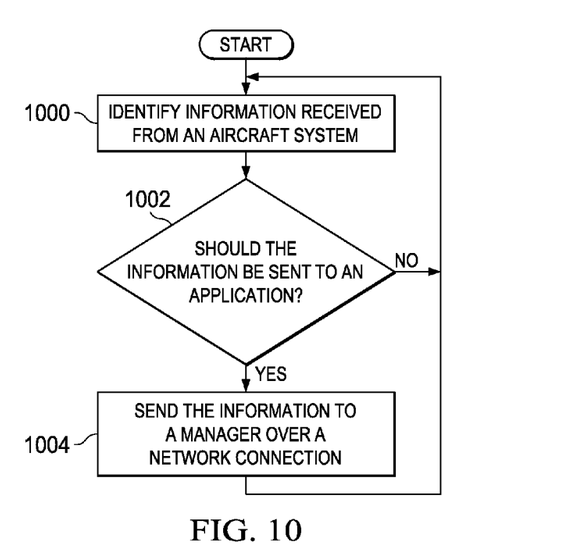
FIG. 10 is an illustration of a flowchart of a process for identifying information for an application in accordance with an illustrative embodiment.

Turning now to FIG. 10, an illustration of a flowchart of a process for identifying information for an application is depicted in accordance with an illustrative embodiment. The process illustrated in FIG. 10 may be implemented in information agent 308 in FIG. 3, manager 306 in FIG. 3, or both.

The process begins by identifying information received from an aircraft system (operation 1000). Thereafter, the process determines whether the information should be sent to an application (operation 1002). This determination may be made by using the subscriptions generated from requests received from applications.

If the information should be sent to the application, the process then sends the information to a manager over a network connection (operation 1004) with the process returning to operation 1000. When sending information in operation 1004, a time stamp may be added to the information. The time stamp may be used to process data from different sources. For example, the time stamp may be used to sort or organize information received at different times from different sources.

In these illustrative examples, operation 1004 may include associating the information with the application. This association may be made through the use of an identifier or other indicator that may be included with, or sent in association with, the information identified for the application. With reference again to operation 1002, if the information should not be sent to the application, the process returns to operation 1000.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 11:
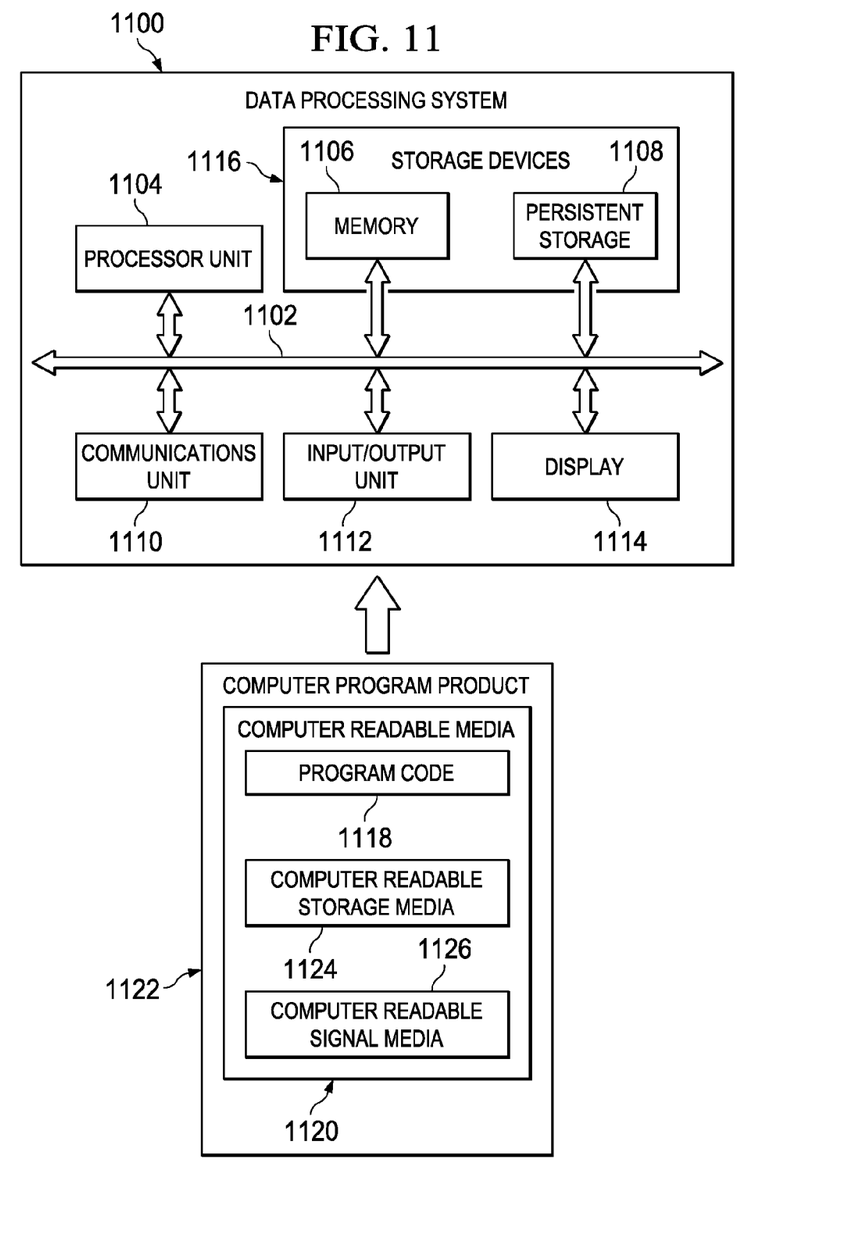
FIG. 11 is an illustration of a data processing system in accordance with an illustrative embodiment.

Turning now to FIG. 11, an illustration of a data processing system is depicted in accordance with an illustrative embodiment. Data processing system 1100 may be used to implement one or more of aircraft nodes 206 in FIG. 2. Data processing system 1100 may be used to implement line replaceable units 210 in FIG. 2. Additionally, data processing system 1100 also may be used to implement host line replaceable unit 302 and existing line replaceable unit 304 in FIG. 3. In this illustrative example, data processing system 1100 includes communications framework 1102, which provides communications between processor unit 1104, memory 1106, persistent storage 1108, communications unit 1110, input/output (I/O) unit 1112, and display 1114. In this example, communication framework may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, data, program code in functional form, and/or other suitable information either on a temporary basis and/or a permanent basis. Storage devices 1116 may also be referred to as computer readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these illustrative examples. In one example, computer readable media 1120 may be computer readable storage media 1124 or computer readable signal media 1126.

In these illustrative examples, computer readable storage media 1124 is a physical or tangible storage device used to store program code 1118 rather than a medium that propagates or transmits program code 1118.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1100 are not meant to provide architectural limitations to the manner in which different embodiments may be implemented. The different illustrative embodiments may be implemented in a data processing system including components in addition to and/or in place of those illustrated for data processing system 1100. Other components shown in FIG. 11 can be varied from the illustrative examples shown. The different embodiments may be implemented using any hardware device or system capable of running program code 1118.

Thus, the illustrative embodiments provide a method and apparatus for accessing information from aircraft systems that are connected to nodes. In particular, the illustrative embodiments may be used to access information received from aircraft systems by existing line replaceable units.

The illustrative embodiments may configure existing line replaceable units to act as access points for other nodes or line replaceable units for information received from the aircraft systems. In these illustrative examples, this access may be provided through the use of an information agent on an existing line replaceable unit.

In this manner, additional functionality may be added to existing aircraft through the use of information management system 214. Further, fewer changes to designs for aircraft may be made by adding information management system 214 to provide access to information generated by aircraft systems. For example, the aircraft systems may not need to be redesigned to be connected to an aircraft network data processing system.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
an existing aircraft node connected to a number of aircraft systems and a network in an aircraft network data processing system; and
an information agent located in the existing aircraft node, wherein the information agent is configured to provide access to information received by the existing aircraft node to other aircraft nodes in the aircraft network data processing system.

2. The apparatus of claim 1, wherein in being configured to provide access to the information received by the existing aircraft node to the other aircraft nodes in the aircraft network data processing system, the information agent is configured to identify the information received from the number of aircraft systems for an application using a subscription for the application in a host aircraft node in the other aircraft nodes and send the information identified to the application in the host aircraft node.

3. The apparatus of claim 2, wherein the subscription identifies at least one of a type of information, an event, and the application.

4. An apparatus comprising:
an aircraft node configured to be located in an aircraft and communicate with a number of aircraft systems in the aircraft; and
an information agent located in the aircraft node, wherein the information agent is configured to identify information received from the number of aircraft systems that correspond to a subscription for an application in a host aircraft node in the aircraft and send the information identified to the application in the host aircraft node.

5. The apparatus of claim 4 further comprising:
the host aircraft node configured to receive the information from the aircraft node and send the information to the application.

6. The apparatus of claim 5 further comprising:
a manager located in the host aircraft node, wherein the manager is configured to receive a request from the application in the host aircraft node, communicate with the information agent to generate the subscription, receive the information from the information agent, and send the information to the application.

7. The apparatus of claim 6, wherein in being configured to send the information to the application, the manager is configured to place the information into a data buffer for the application.

8. The apparatus of claim 4, wherein the information agent is configured to encrypt the information.

9. The apparatus of claim 4, wherein the subscription identifies at least one of a type of information, an event, and the application.

10. The apparatus of claim 4, wherein the aircraft node is a line replaceable unit.

11. The apparatus of claim 4, wherein an aircraft system in the number of aircraft systems is selected from one of a sensor system, a flight recorder, a navigation system, a flight control system, an environmental control system, and an engine system.

12. An information management system comprising:
an aircraft node configured to be located in an aircraft and communicate with a number of aircraft systems in the aircraft;
a host aircraft node configured to communicate with the aircraft node;
an information agent in the aircraft node, wherein the information agent is configured to identify information received from the number of aircraft systems that correspond to a request from the host aircraft node in the aircraft and send the information identified to the host aircraft node; and
a manager located in the host aircraft node, wherein the manager is configured to process the information received from the information agent from the aircraft node and process the information received from the aircraft node.

13. The information management system of claim 12, wherein the information agent is configured to encrypt the information.

14. The information management system of claim 12, wherein the aircraft node is a line replaceable unit.

15. The information management system of claim 12, wherein an aircraft system in the number of aircraft systems is selected from one of a sensor system, a flight recorder, a flight control system, an environmental control system, and an engine system.

16. A method for collecting information in an aircraft, the method comprising:
  identifying the information received from a number of aircraft systems at an aircraft node using a number of connections to the number of aircraft systems, wherein the information identified is requested information that is requested by an application in a host aircraft node; and
  sending the requested information to the application in the host aircraft node.

17. The method of claim 16, wherein sending the requested information to the application in the host aircraft node comprises:
  sending the requested information to the application in the host aircraft node using a network in an aircraft network data processing system.

18. The method of claim 16, wherein the identifying step and the sending step are performed by an information agent located in the aircraft node.

19. The method of claim 18, wherein the information agent is configured to provide access to the information received by the aircraft node to other aircraft nodes in an aircraft network data processing system.

20. The method of claim 18, wherein the information agent identifies the requested information using a subscription for the application.

* * * * *